W. H. WINSLOW.
AUTOMOBILE CONSTRUCTION.
APPLICATION FILED APR. 15, 1911.
1,198,388.
Patented Sept. 12, 1916.
6 SHEETS—SHEET 6.
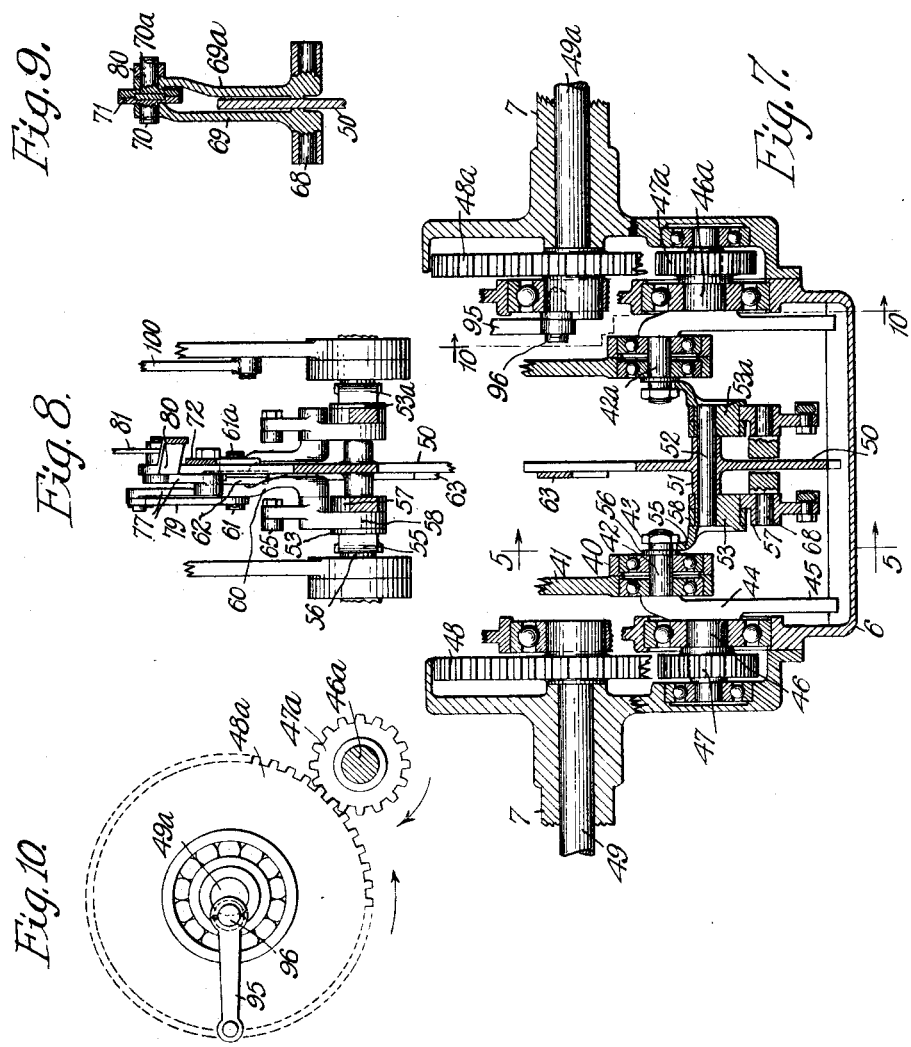

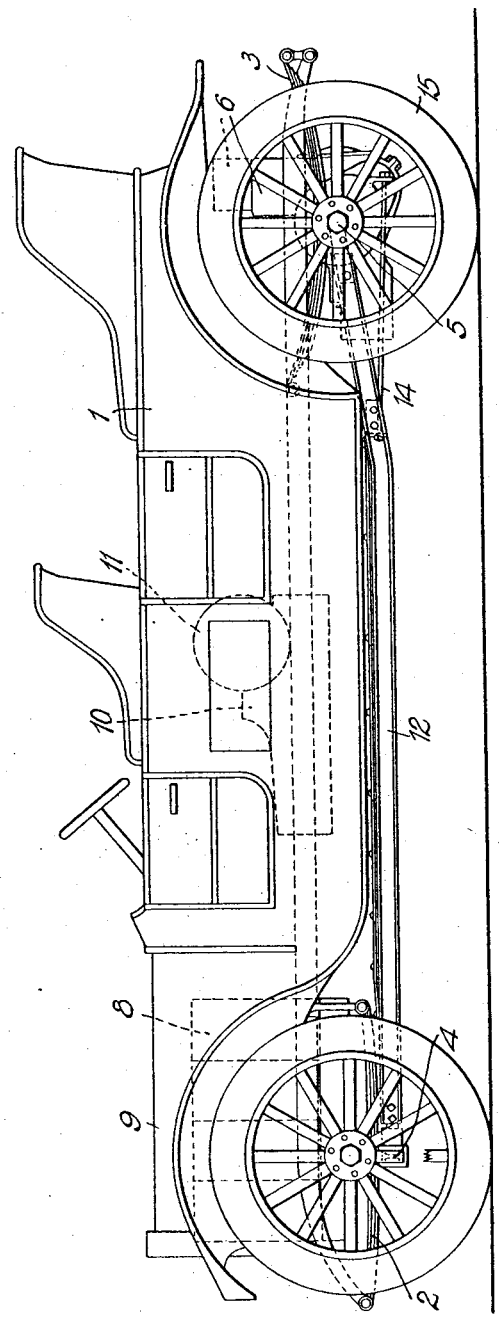

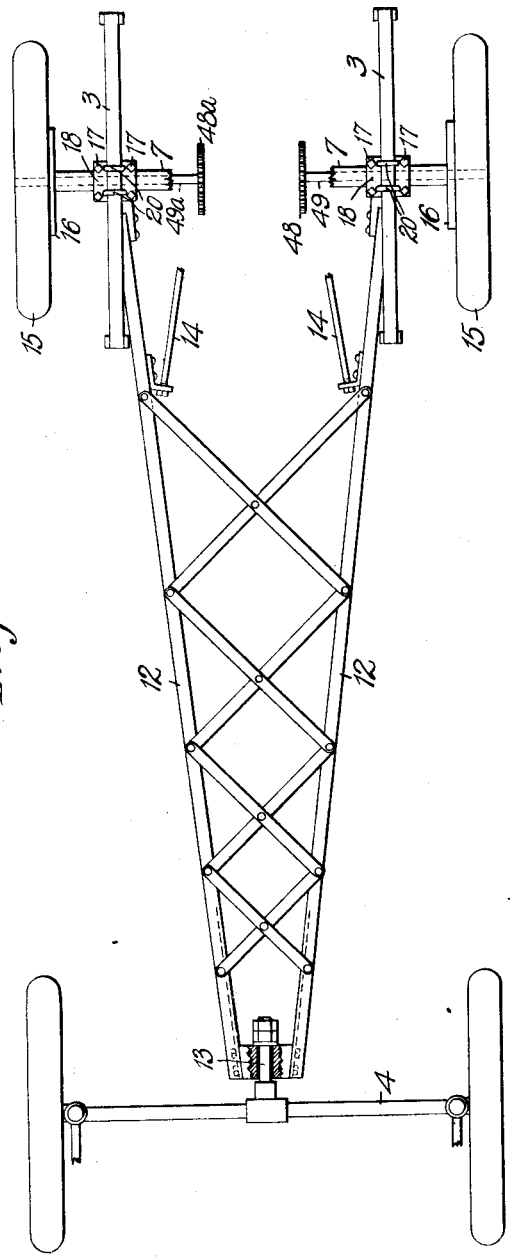

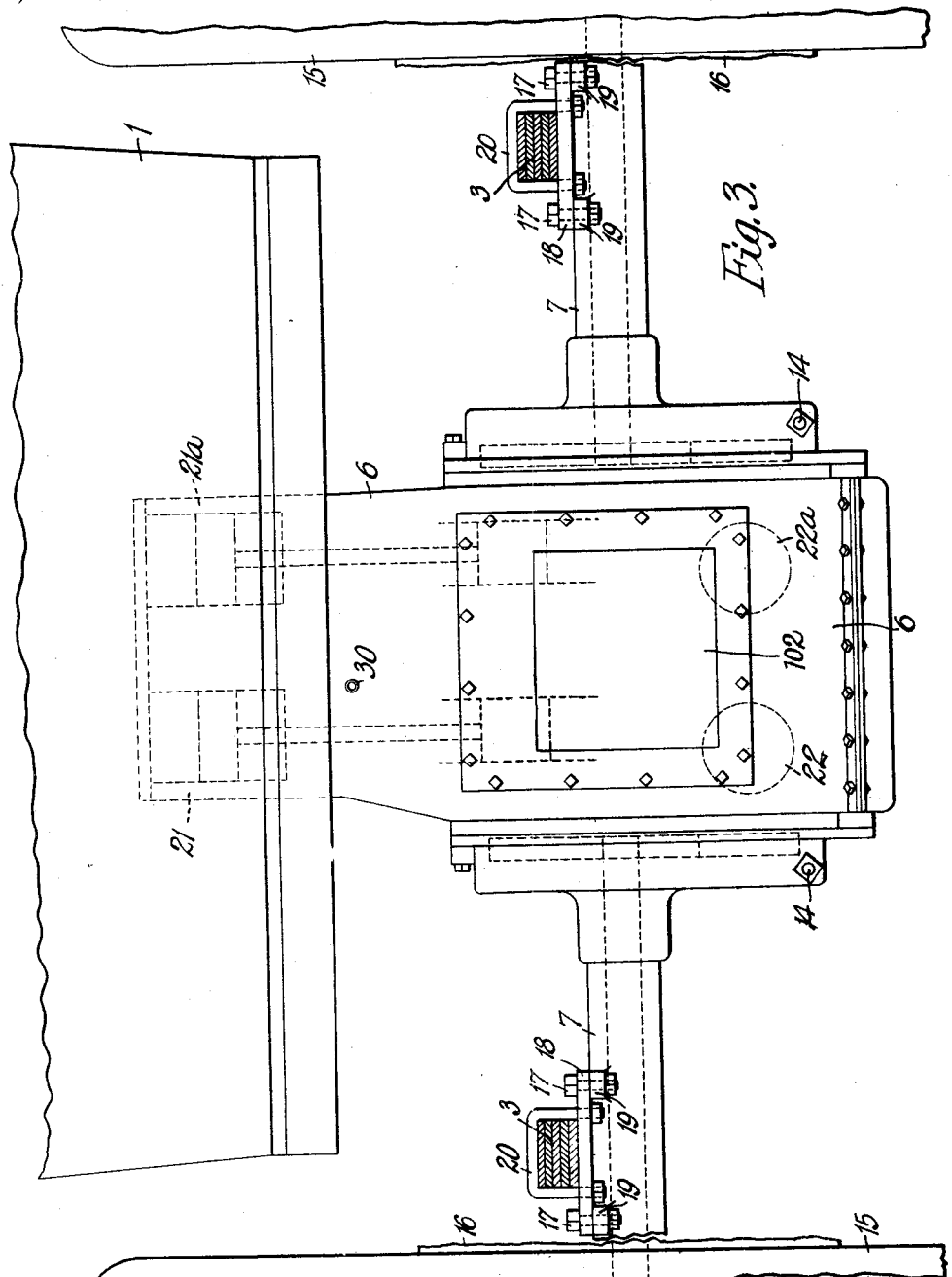

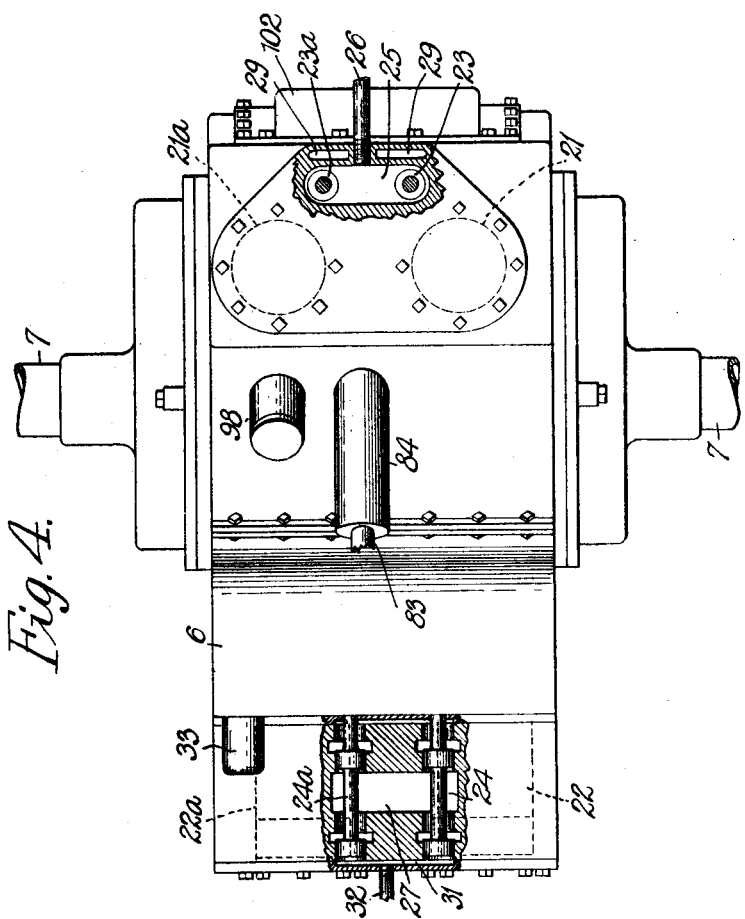

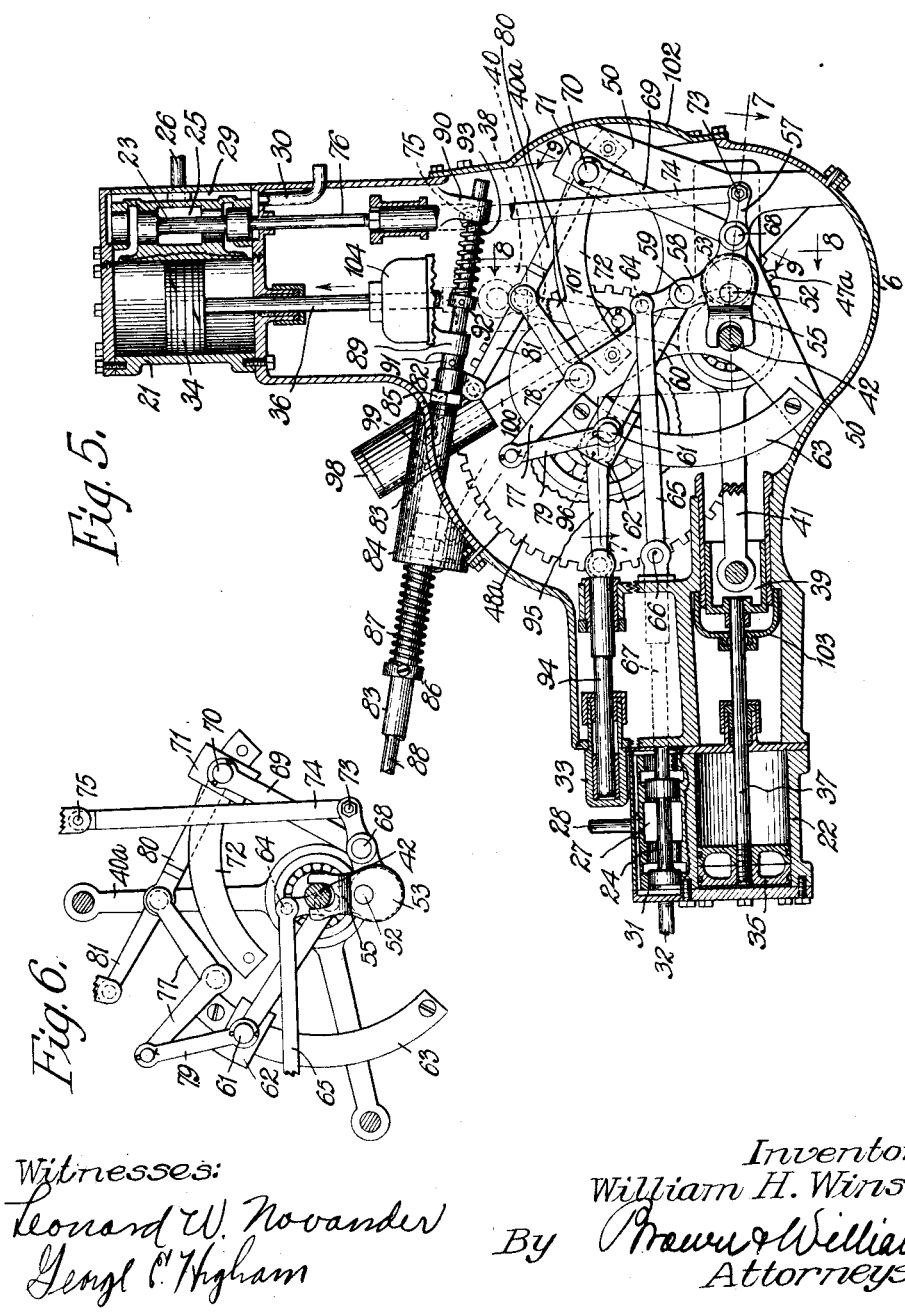

UNITED STATES PATENT OFFICE.

WILLIAM H. WINSLOW, OF CHICAGO, ILLINOIS, ASSIGNOR TO WINSLOW SAFETY HIGH-PRESSURE BOILER CO.

AUTOMOBILE CONSTRUCTION.

1,198,388.  Specification of Letters Patent.  Patented Sept. 12, 1916.

Application filed April 15, 1911. Serial No. 621,199.

*To all whom it may concern:*

Be it known that I, WILLIAM H. WINSLOW, a citizen of the United States, residing at Chicago, in the county of Cook and State of Illinois, have invented a certain new and Improved form of Automobile Construction, of which the following is a full, clear, concise, and exact description, reference being had to the accompanying drawings, forming a part of this specification.

My invention relates to an improved form of automobile construction and engine adapted to propel the same.

Heretofore in the art, it has been customary to mount the engine upon the framework of the vehicle and to communicate with the wheels to be driven either by driving chains or shafts and gearing, in connection with which it has been necessary to employ differential gearing, so that the two driven wheels of the vehicle may be driven at different speeds as occasion may require, for example, in turning curves. By my invention I entirely eliminate the differential gearing and mount the engine structure directly upon the housing of an axle of the vehicle, and provide a separate motive power for each wheel connected with such axle, although the separate motive power units are so related that they receive the power in common, and the distribution to the two units is automatically effected according to the relation between the demands upon such units at any instant by the conditions under which the corresponding wheels are operating.

In the preferred embodiment of my invention, I employ a steam engine consisting of two separate units, each unit connected to one of the rear wheels of the vehicle, while both units are so related to a common steam chest that either or both of the units may take steam from the chest as required. Each unit consists preferably of two cylinders angularly displaced from each other, so that such unit may be self-starting for all conditions, and the two units thus constructed are assembled and form a part of a single housing supported by the rear axle structure. Mechanism is provided which affords a means for controlling simultaneously the running condition of each unit, whether its direction of motion is forward or backward, and the point of cut-off for either direction of motion, such mechanism being constructed, however, so that each unit is separately controlled regardless of the angular position of its moving parts relatively to the other unit.

My invention further provides an improved means by which the rear axle of the vehicle and all of the parts permanently associated therewith may be removed from the remaining portion of the vehicle to facilitate inspection, repair, or replacement of any or all of the parts.

As a result of the arrangement described, I provide a construction of self propelled vehicle, in which there is no connection whatever between the parts permanently associated with the rear axle and the remaining portions of the vehicle except the piping necessary to control the operation of the engine, the necessary supporting connections of the vehicle, and the means employed to control the brakes upon the wheels of the vehicle. The difficulties incident to transmission mechanism and speed changing gears, are, therefore, entirely eliminated and it is possible to give to the vehicle more satisfactory constructional lines than is possible with the use of such transmission gearing.

The several drawings illustrating my invention are as follows:

Figure 1 is a side view of an automobile constructed in accordance with my invention. Fig. 2 is a plan view of the running gear used in the structure shown in Fig. 1. Fig 3 is an enlarged rear end view of the structure shown in Fig. 1. Fig. 4 is a top view of the engine showing its housing and support from the rear axle structure and also partially in section the valves employed to control the operation of the engine pistons. Fig. 5 is a vertical sectional view through the centers of two of the engine cylinders and shows the disposition of the mechanism in the engine casing, and the relation of the parts used to control and reverse the direction of motion of the engine pistons. Fig. 6 is a detailed view of the reversing mechanism shown in Fig. 5, removed from the rest of the mechanism to more clearly illustrate its construction and operation. Fig. 7 is a sectional view of a portion of the mechanism shown in Fig. 5, taken along the line 7—7. Fig. 8 is a sectional view of a portion of the mechanism shown in Fig. 5, taken along the line 8—8. Fig. 9 is a sectional view of a portion of the mechanism shown in Fig. 5 taken along the line 9—9. Fig. 10 is a sectional view of a portion of the mechanism shown in Fig. 7 taken along the line 10—10.

Similar numerals refer to similar parts throughout the several views.

As shown in Figs. 1, 2 and 3, the automobile body 1 is supported by springs 2 and 3 from front and rear axles 4 and 5 in a manner well-known in the art. In the embodiment shown the vehicle is adapted to be propelled by a steam engine, the casing 6 of which is mounted upon the rear axle casing 7. A boiler 8 is disposed at the front end of the vehicle in the hood 9, and the usual water and fuel tanks 10 and 11 are disposed under the front seat of the vehicle. The two axles 4 and 5 are secured together by a distance member or strut 12, pivoted at 13 upon a bolt extending rearwardly from the middle portion of the front axle 4 and secured at its rear end beneath the springs 3 to the casing 7 of the rear axle. Bracing rods 14 extend from the strut 12 to the engine casing 6 to assist in maintaining such casing in proper angular position relative to the body of the vehicle. The rear wheels 15 are provided with the usual brake drums 16, but as the particular manner of braking the vehicle constitutes no part of my present invention, such braking mechanism is not here shown or described. The strut or reach 12 is secured to each spring 3 by means of bolts 17 extending through a plate 18 and lugs 19 formed on the casing 7 of the rear axle. Each plate 18 is secured to the corresponding spring 3 by two U-bolts 20, as indicated, which secure the plate to the spring regardless of whether the plate is connected to the axle casing 7 or not.

As a result of the construction described when it is desired to inspect or test the engine or repair the engine or running gear, the rear end of the body 1 is jacked up, the bolts 17 are removed, the nuts are removed from the pivot bolt 13, and the piping connected with the engine casing and also the members connecting with the braking devices are removed; and the rear axle together with the strut 12 and all parts carried thereby may be readily removed from the rest of the vehicle and the engine and associated mechanism may be inspected with the greatest facility. By this means I also provide that a substitute engine and running gear mechanism may be quickly placed in commission while the original mechanism is being repaired, and as the engine and running gear are a comparatively inexpensive part of the vehicle as a whole, this arrangement provides a means by which a spare motor mechanism may be kept on hand for emergencies that may arise, which is a particularly desirable thing in connection with the use of motor vehicles for business purposes.

As indicated in Fig. 3, the engine casing 6 supports two vertical cylinders 21 and 21$^a$, which are disposed side by side and extend upward from the axle casing 7 beneath the rear seat of the vehicle 1; and two horizontal cylinders 22 and 22$^a$, disposed side by side, and extending forwardly from the axle casing 7. The cylinders 21 and 21$^a$ are, therefore, disposed substantially at 90 degrees to the cylinders 22 and 22$^a$, and as the cylinders 21 and 22 coöperate to drive one rear wheel of the vehicle while the cylinders 21$^a$ and 22$^a$ coöperate to drive the other rear wheel, it will at once be seen that a means is provided by which each wheel may be driven independently of the other so that the speeds of the two engine units may bear to each other any ratio required to meet a particular operating condition, and further that each engine unit is always in a condition to start and drive its associated wheel regardless of the angular position of the crank pin driven by such unit.

As shown in Fig. 4, the operation of the cylinders 21 and 21$^a$ is controlled by the cylindrical valves 23 and 23$^a$, while the operation of the cylinders 22 and 22$^a$ is controlled by the cylindrical valves 24 and 24$^a$ respectively. The valves 23 and 23$^a$ are in communication with the common steam chest 25 supplied with steam by a pipe connection 26, as a result of which either or both of the cylinders 21 and 21$^a$ take steam from the steam chest 25 through the operation of the valves 23 and 23$^a$ according to the conditions under which the wheels driven by the pistons in the cylinders 21 and 21$^a$ are operating, and thus a differential action is secured by means of the common steam chest 25 between the driven wheels of the vehicle without the use of mechanism of any description, connecting such wheels with each other. The valves 24 and 24$^a$ communicate with a common steam chest 27, having a steam supply pipe 28, by which they control the operation of the pistons in the cylinders 22 and 22$^a$ in a manner similar to that described for the pistons in the cylinders 21 and 21$^a$. The ends of the bores in which the valves 23 and 23$^a$ operate are connected together, as indicated in Figs. 4 and 5, by a passageway 29 with which an exhaust pipe 30 connects, as indicated in Fig. 5. The valves 24 and 24$^a$ are provided with a similar passage 31 and exhaust pipe 32.

The view shown in Fig. 5 is in addition to being taken along the line 5—5 shown in Fig. 7 taken through the center of the cylinders 21 and 22 and also through the center of the valves 23 and 24, and of the water pump 33, in order to more clearly show the relation of these various parts to the driven and controlling mechanism. As shown in this view the cylinders 21 and 22 are provided with pistons 34 and 35 connected to piston rods 36 and 37, terminating in cross-heads 38 and 39 respectively. Connecting rods 40 and 41 are pivotally connected with the cross-heads 38 and 39, and at their other ends independently engage a common crank pin 42, as more clearly indicated in Fig. 7. The ends of the connecting rods 40 and 41, engaging the crank pin 42 are of comparatively large diameter so as to carry the outer races of ball bearings, the inner races of which are securely clamped upon the crank pin 42 by means of the nut 43. The crank pin 42 is carried by a crank 44 provided with a counter weight 45, as is usual in the art. The crank 44 is mounted upon a crank shaft 46 supported in ball bearings in the casing 6 of the engine, and such shaft has rigidly secured to it a pinion 47, meshing with the gear 48, rigidly secured to a shaft 49 extending through the axle casing 7 to one of the rear wheels of the vehicle, which is rigidly connected with such shaft 49. A ball bearing is mounted in the casing 6 of the engine to support the inner end of the shaft 49.

The casing 6 supports centrally and in a plane extending longitudinally of the vehicle a spider 50, upon which are mounted the parts employed in operating and controlling the valves of the engine cylinders. The spider is provided with a boss 51, extending from both its sides, in which a pin 52 is driven. The projecting ends of the pin 52 have rotatably mounted upon them the eccentrics 53 and 53ª. The eccentric 53 is provided with a forked arm 55 adapted to engage the end of the crank pin 42, and is held in proper position thereon by the grooved collar 56 and the nut 43. The eccentric 53 rotatably engages the ends of the levers 57 and 58 adapted to operate the valves 23 and 24 respectively. The lever 58 is pivotally mounted near its middle portion upon a pin 59 extending from one end of a restraining link 60, the other end of which is pivotally secured to a pin 61, carried by a block 62 mounted upon a curved slide 63 secured at its ends to the spider 50. The other end of the lever 58 is pivotally connected at 64 with a connecting rod 65, pivotally connected at its other end 66 with the outer end of the valve rod 67 connected with the valve 24. The parts described are so proportioned that when the block 62 occupies the position indicated upon the slide 63 the crank shaft 42 will be caused to revolve around to the right, as seen in Fig. 5; and when the block 62 is moved down upon the slide 63 the portion of the stroke during which the admission ports of the cylinder 22 are open is reduced so that cut-off may be obtained at any point desired, and when the block 62 is moved to its extreme lower position, as seen in Fig. 5, the relation of the valve 24 to the piston 35 causes an opposite direction of rotation of the crank pin 42. The valve 24ª is provided with mechanism for actuating it from the crank pin 42ª connected with the piston in the cylinder 22ª, which is identical with that described above for the valve 24; and the block 62 has a pin 61ª projecting from its far side, as seen in Fig. 5 to engage and control the mechanism for the valve 24ª as the mechanism described above is controlled by the pin 61.

The lever 57 is pivotally supported near its middle point upon a pin 68 carried by a restraining link 69, the other end of which is pivotally supported upon a pin 70 carried by a block 71 mounted upon a curved slide 72. The other end of the lever 57 has pivotally connected therewith at 73 the lower end of a link 74, the upper end of which is pivotally connected at 75 with the lower end of the valve rod 76 connected with the valve 23. The slide 72 is of such conformation and is so placed that when the block 71 occupies the position indicated in Fig. 5 the piston 34 is operated in such a manner as to cause rotation around to the right of the crank pin 42, while motion of the block 71 over to the left upon the slide 72 first serves to decrease the length of stroke during which steam is admitted to the cylinder 21, and then for further motion of the block 71 to the left, to reverse the operating condition of the piston 34 in a manner precisely the same as that in which motion of the block 62 upon the slide 63 changes the operating condition of the piston 35. The valve 23ª is provided with operating mechanism actuated by the crank pin 42ª in precisely the manner described above for the mechanism involved in the operation of the valve 23; and the block 71 has extending from its far side, as seen in Fig. 5, a pin 70, as shown in Fig. 9, operating when the block 71 is moved on the slide 72 to control the relation of the valve 23ª to the piston contained in the cylinder 21ª in precisely the same manner that such motion of the block 71 controls the relation of the valve 23 to the piston 34. A bell-crank 77 is pivotally mounted upon a pin 78 carried by the spider 50, the left hand end of such bell-crank being connected by a link 79 with the pin 61 of the block 62, while the right hand end of such bell-crank is connected by a link 80 with the pin 70ª carried by the block 71. The bell-crank 77 and the links 79 and 80 are so proportioned that motion of the bell-crank serves to move the blocks 62 and 71 simultaneously upon the slides 63 and 72, so that the same relation is maintained between the valves 24 and 24ª and their associated pistons that exists at any time between the valves 23 and 23ᵃ and their associated pistons.

The right hand end of the bell-crank 77 is also connected by a link 81 with a collar 82 screwed on to the right hand end of the tube 83, extending to the left through a tubular extension 84 formed on the casing 6. The collar 82 is maintained in proper position upon the tube 83 by means of the jam nut 85, and the tube 83 has secured to it outside of the portion 84 of the casing a collar 86, between which and the end of the tubular portion 84 a tension spring 87 is located. The tube 83 contains within it a rod 88 supported within a casing 6 by lugs 89 and 90 formed thereon. Just to the left of the lug 89 a collar 91 is secured to the rod 89 in a position to be engaged by the right hand end of the tube 83, and between the lugs 89 and 90 a second collar 92 is secured to the rod 88 to be engaged by the left hand end of the compression spring 93, extending between such collar and the lug 90. The spring 87 is constructed of such a strength as to move the blocks 62 and 71 as far up and to the right respectively on their corresponding slides as the position of the rod 88 will permit. For the position of such rod indicated in the drawings, such blocks and the parts carried thereby are moved to the position indicated, which allows the pistons to take steam from the steam chests for their full stroke in each direction. This represents the condition of operation when the maximum possible power of the engine is required, although it will be understood that the engine at this time is not working as efficiently as for other relations of the valve mechanism. The spring 93, which is constructed so as to be considerably stronger than the spring 87, moves the rod 88 to the left until the collar 92 engages the lug 89, which prevents further motion of the rod 88. For this motion the collar 91 secured to the rod 88 moves the tube 83 to the left sufficiently to rotate the bell-crank 77 around to the left, as seen in Fig. 5, to move the blocks 62 and 71 to a position giving the most effective running condition of the engine in a forward direction, which position is commonly referred to as the "hook-up" position. For this condition the admission ports of the engine are closed at such a portion of the stroke that the full value of the steam admitted is employed expansively in the cylinders.

From the description given above it will appear that each of the crank pins 42 and 42ᵃ is entirely independent from the other and that the mechanism supported thereby bears no relation whatever in its operation to the mechanism controlled by the other crank pin, and further that each crank pin directly controls the valve mechanism of the two cylinders employed to operate it by means of a single eccentric and that the two independent engine units thus formed are controlled simultaneously both as to reversal, and the point of cut-off for either direction of motion by a single actuating mechanism of simple construction regardless of the position of the mechanism of one engine unit relatively to the mechanism of the other unit.

The water pump 33 carried by the casing 6 is provided with a plunger 94 pivotally connected at its right hand end with a connecting rod 95, which rod at its right hand end is engaged by a pin 96 eccentrically carried by the left hand end of the shaft 49ᵃ, as seen in Fig. 7. The casing 6 also carries an air pump 98, the piston 99 of which is pivotally connected with the upper end of the connecting rod 100, the lower end of which engages a pin 101 carried by the connecting rod 40ᵃ of the cylinder 21ᵃ. As a result of the connections described when the engine is operated the pumps 33 and 98 are actuated in a manner well-known in the art to feed water to the boiler and compress the air in the fuel tank.

The casing 6 is provided with a cover-plate 102 on its rear wall, by removing which access may be readily had to all of the mechanism contained within such casing, and if desired for purposes of inspection or repair, the spider 50 and all of the controlling mechanism carried thereby may be removed from the casing in assembled condition by releasing the connections holding the spider in place when the crank pins 42 and 42ᵃ are in their lowermost position and the link 81 and the valve connecting rods are disconnected. The casing 6 is completely inclosed, and may if desired contain oil to thoroughly lubricate the moving parts. Caps as shown at 103 and 104 are provided in connection with the cross-heads to constitute an extra protection for the piston rods of the engine.

From the above it will appear that by my valve mechanism I am able to control the operation of four engine cylinders with a comparatively small number of parts and that, therefore, the space required within the engine casing to accommodate these parts is reduced to a minimum.

In connection with the description of the valve controlling mechanism given above and the drawings illustrating the same, it will be noted that the parts supported by the spider 50 are held in place thereon by the relation of the links to each other and to the eccentrics controlling them and that these parts are held in place by the engagement of the forked ends of the arms extending from the eccentrics 53 and 53ᵃ with the corresponding crank pins, thus making it a comparatively simple matter to separate the eccentrics from the corresponding levers and to remove the parts from the supporting pins carried by the spider when it is desired to separate the parts from each other.

The surface of the spider 50 may be finished on both its sides, or if desired only portions thereof may be finished to be engaged by the links of the controlling mechanism, as indicated for the restraining links 69 and 69ª shown in Fig. 9. It is to be noted, however, that only such parts of the apparatus come in sliding engagement with the surface of the spider 50 as are normally at rest or moved but very little, as a result of which the wear upon such parts is practically negligible.

While the pumps 33 and 98 are shown as operated by the same engine unit, it is to be understood that either unit may be employed for this purpose, or that either unit may operate either pump in any suitable manner, without departing from the spirit of my invention.

From the description given above of the operation of the common steam chest in connection with two engine cylinders of different units, it will be understood that although differential gearing is entirely eliminated, the engine construction affords what in many ways are similar results. That is, the driving force during normal operating conditions is always present, ready to be appropriated by the mechanism operating either wheel according to the conditions under which the wheels are operating; and again, the amount of energy imparted to either wheel is always substantially equal to the difference between the total amount of energy imparted to the driving mechanism and that imparted to the other wheel. On the other hand, the connection between the motive power and the driven wheels is more elastic than it is possible to secure with any combination of gears without in any way interfering with the effectiveness of operation of the device, and for any practical condition of operation the slippage of one of the wheels does not deprive the other wheel of its driving force, while in the case of differential gearing to secure effective driving with either wheel the coefficient of friction of both wheels with the roadway or pavement must be relatively high, since the slippage of either wheel deprives the other wheel of its driving force.

While the gears 48 and 48ª may if desired have the same number of teeth and be of the same diameter, it is preferable to have the number of teeth different. For instance, the gear 48 may have 54 teeth while the gear 48ª is provided with 55 teeth, as a result of which the possibility of the two sections of the engine keeping in step with each other will be prevented, and thus the building up of the vibration tendency of the two parts of the engine, due to the simultaneous thrust in the same direction of the parts of the two sections of the engine which may be unequally distributed, is avoided. In this way the wear and jar on the moving parts and the housing is reduced to a minimum.

Many changes in the mechanism disclosed may be employed without departing from the spirit of my invention, and I therefore desire to claim broadly all mechanical equivalents that may suggest themselves to those skilled in the art. I believe that I am the first to employ independent prime movers (as distinguished from secondary movers, such as electric motors), one for each independent half of a driving axle, with all the detail and incidental advantages arising from that combination.

What I claim is:

1. In a steam engine driven vehicle comprising a body and running gear, the combination of an engine mounted wholly upon a driving axle, a reach rigidly secured to the engine and the axle and means for readily detaching from the vehicle the assembled driving axle, engine and reach as a single structure.

2. A motor driven vehicle, the combination of driving wheels, driving means connecting with the wheels, a reach rigidly secured to the driving means and means for removably securing the driving means, reach and wheels as a unitary structure to the body of the vehicle.

3. In a motor driven vehicle, the combination of driving wheels, a rear axle connected with the wheels, driving mechanism for the axle, a common housing for the axle and driving mechanism, a reach rigidly secured to the housing and connecting devices for removably securing the housing and reach to the remaining portion of the vehicle.

4. In a motor driven vehicle, the combination of an axle housing, two independent engine units supported by said housing, and a single chamber constituting the mechanical support connecting said units and forming a common steam supply chamber for said units.

5. In a motor driven vehicle, the combination of an axle housing, a casing supported by said housing, an axle in the housing, said housing having a fixed relation to said axle, gearing in the casing connected with the axle, and an engine carried by the housing for driving the gearing, said casing constituting the frame of said engine.

6. In a motor vehicle, the combination of an axle housing, a pair of stub axles in said housing, an engine unit for each axle independently connected thereto, said engine units supported by said housing, and a single chamber constituting the mechanical support connecting the engine units and forming a common steam-supply chamber for said units.

7. In a motor vehicle, the combination of an axle housing, a pair of stub axles secured in said housing and being held in fixed relation thereto, an engine unit for each of said axles independently connected thereto, said engine units being supported by said housing, a single casing constituting the mechanical support connecting said units and forming a common steam-supply chamber for said units.

8. In a motor driven vehicle, the combination of an axle housing, a two-part driving axle in said housing, two engine units, one for each part of the axle, and a single chamber constituting the mechanical support connecting said units and said housing and forming a common steam supply chamber for said units.

9. In a motor driven vehicle, the combination of an axle housing, a two-part driving axle in the housing, a casing supported by said housing, gearing in the casing connected with each part of the axle, and two independent engines carried by the housing for independently driving the two parts of the axle, said casing constituting the frame of the engines and forming a common steam supply chamber for said engines.

10. In a motor-driven vehicle, the combination of a rear-axle housing, a driving axle rotatable in said housing, a driving vehicle wheel on one end of said axle, and a casing mounted between the ends of the housing, to be supported thereby, said casing and housing being secured in fixed relation to each other, said casing comprising a gear compartment, an engine frame and a steam-supply chamber and a pair of engines connected to said steam supply chamber, one of said engines being connected to said axle.

11. In a motor-driven vehicle, the combination of a rear-axle housing, a driving axle rotatable in said housing, a driving vehicle wheel secured to one end of said axle, a pair of steam engines, one of said engines being connected to said axle, and a casing mounted between the ends of the housing and supported thereby, said housing and casing being supported in fixed relation to each other, said casing comprising a gear compartment, a frame for said two engines, and a common steam-supply chamber for said engines.

12. In a motor driven vehicle wheel the combination of axle housing means, a pair of independently rotatable vehicle axles in said means, said axles being disposed in axial alinement, a vehicle wheel for each axle, said wheels being connected to the ends of said axles, a casing supported by said housing, said housing having a fixed relation to said axle, two separately operable steam engines carried by said housing and driving means in said casing, connecting each engine separately with the corresponding driving axle, said casing forming the frame of said engine.

In witness whereof, I hereunto subscribe my name this 12th day of April, A. D., 1911.

WILLIAM H. WINSLOW.

Witnesses:
HARVEY L. HANSON,
ALBERT C. BELL.

Copies of this patent may be obtained for five cents each, by addressing the "Commissioner of Patents, Washington, D. C."